Feb. 20, 1951     E. J. ISBISTER ET AL     2,542,032
RADIO TRACKING SYSTEM
Filed July 30, 1942     3 Sheets-Sheet 1
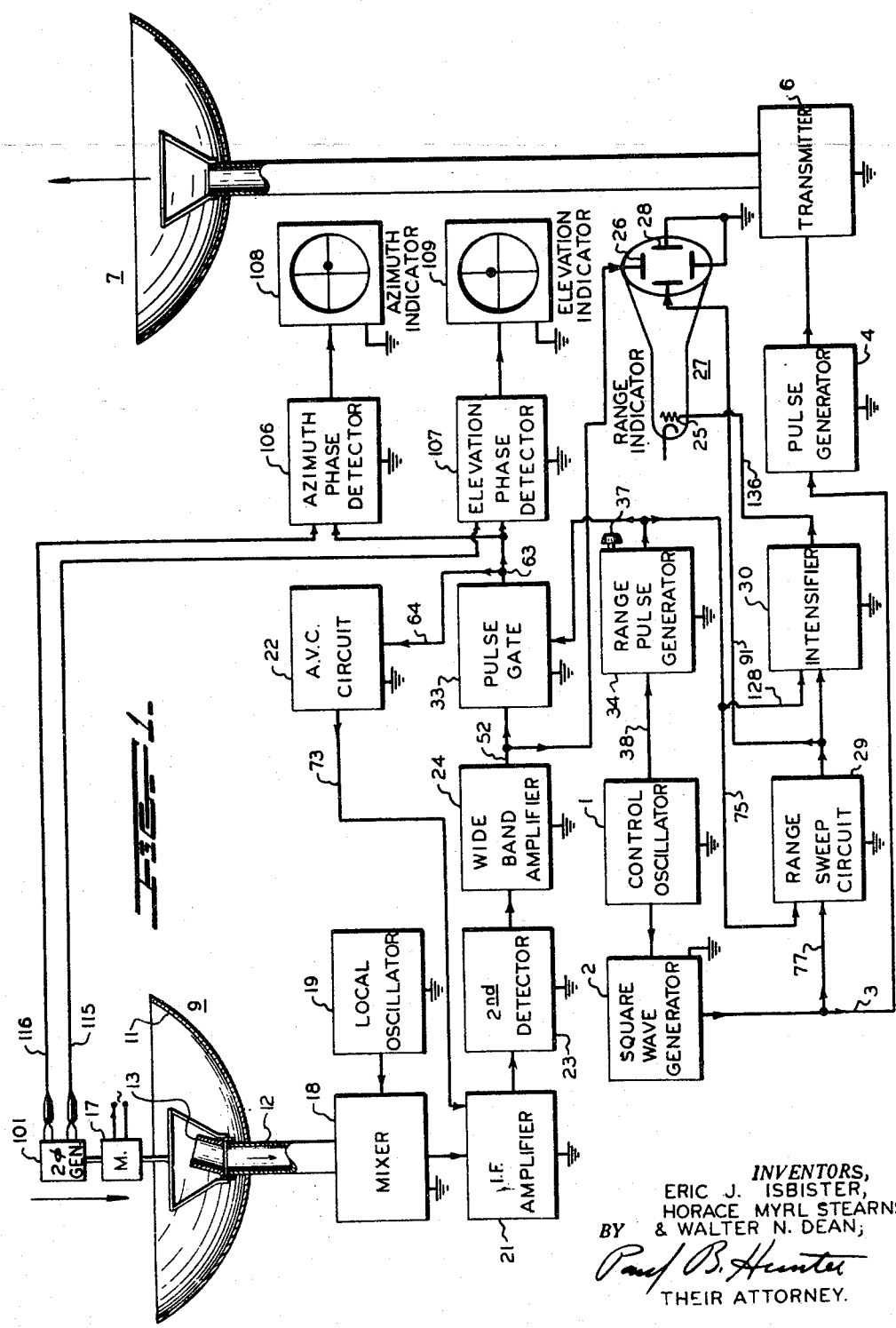
INVENTORS,
ERIC J. ISBISTER,
HORACE MYRL STEARNS,
BY   & WALTER N. DEAN;
THEIR ATTORNEY.

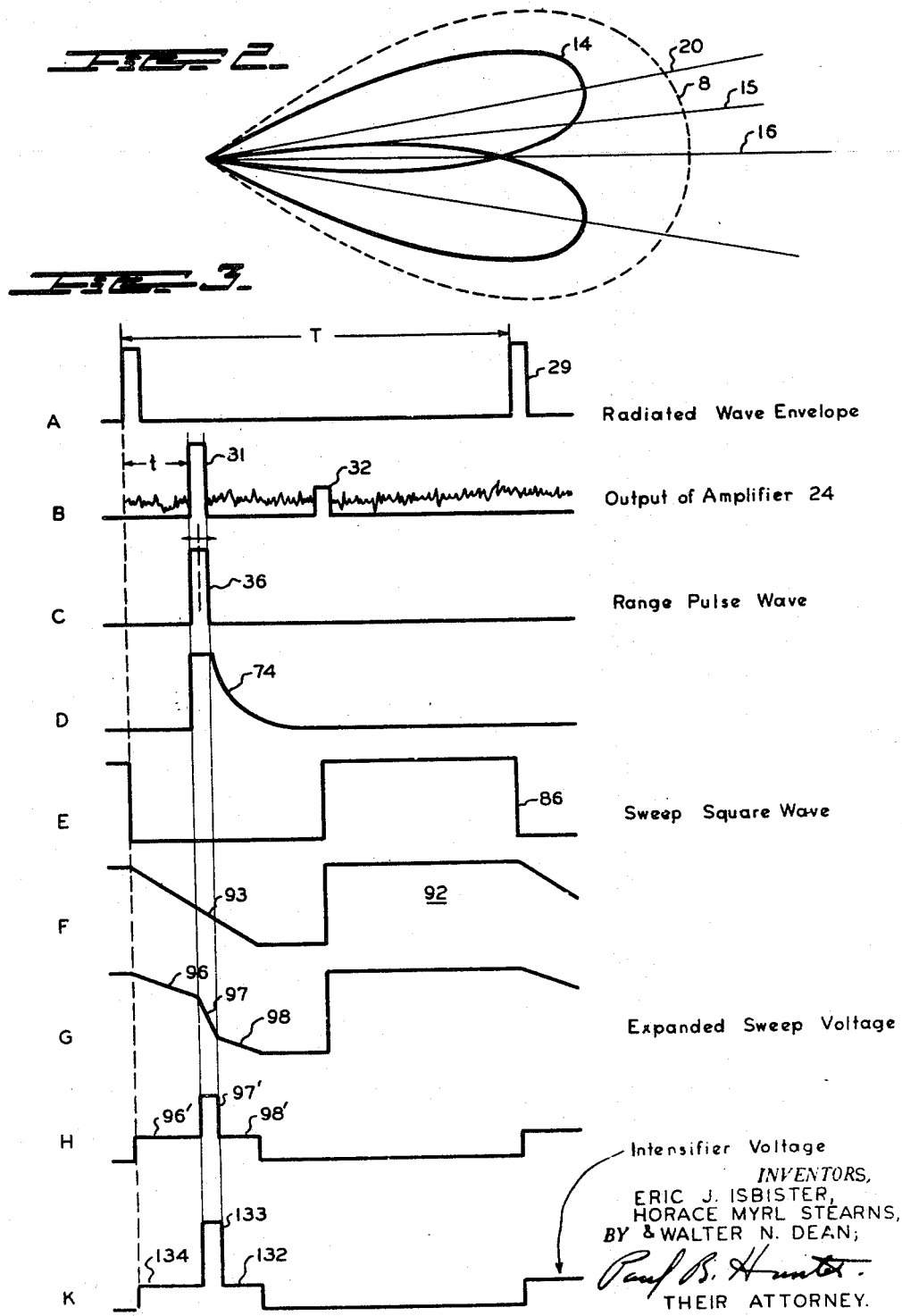

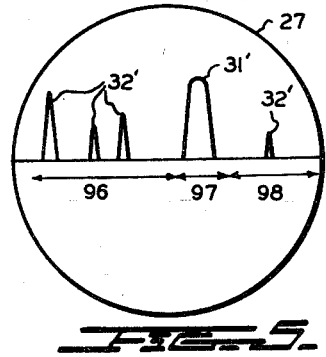
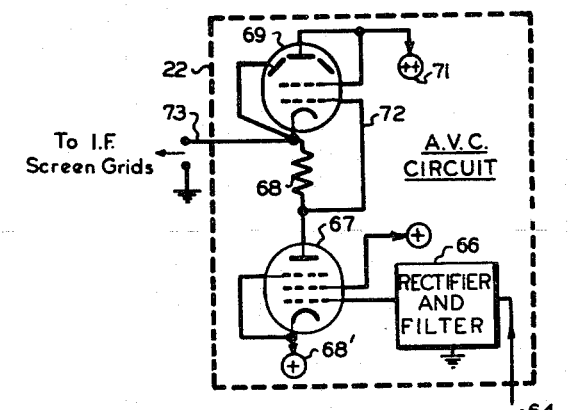
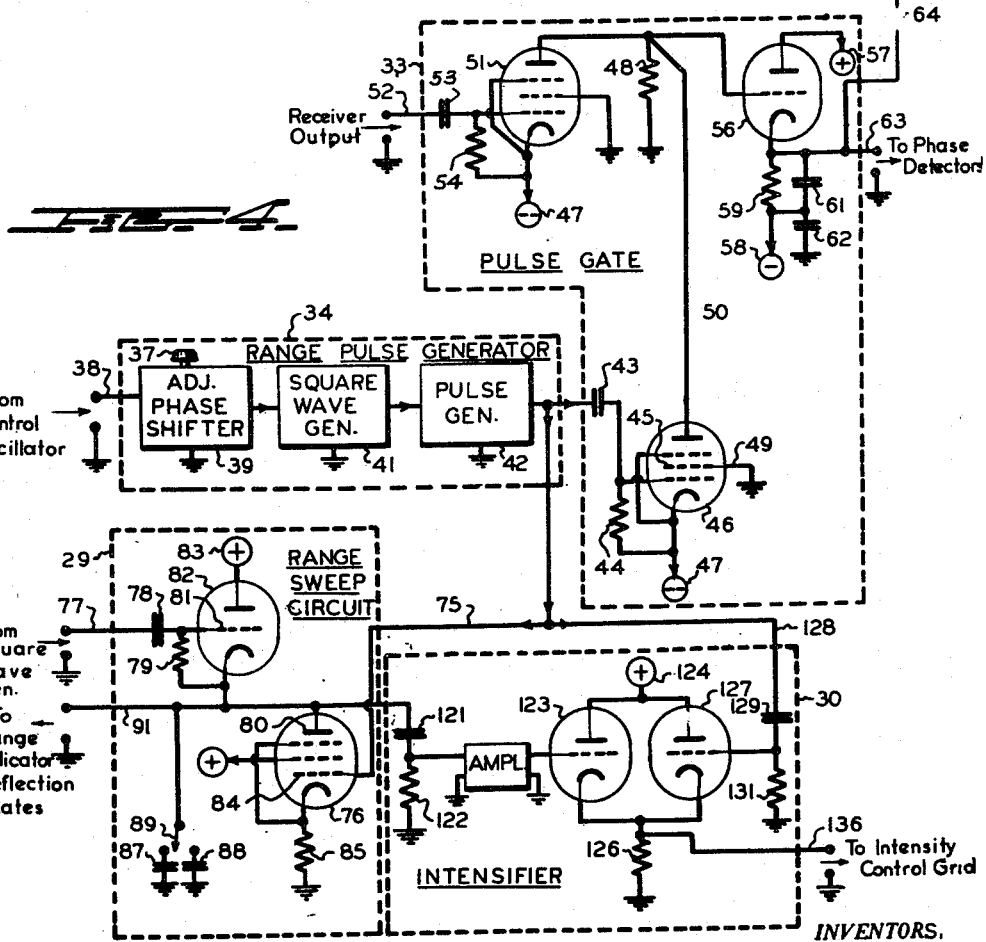
INVENTORS.
ERIC J. ISBISTER
HORACE MYRL STEARNS,
BY & WALTER N. DEAN;
THEIR ATTORNEY.

Patented Feb. 20, 1951

2,542,032

UNITED STATES PATENT OFFICE 2,542,032

RADIO TRACKING SYSTEM

Eric J. Isbister, Forest Hills, Horace Myrl Stearns, Merrick, and Walter N. Dean, Larchmont, N. Y., assignors to The Sperry Corporation, a corporation of Delaware Application July 30, 1942, Serial No. 452,818

13 Claims. (Cl. 343—13)

The present invention relates to object-detecting, and distance- and orientation-determining radio systems.

Systems are known in which the orientation of and distance to a distant target are determined by means of radio waves directed toward the target and reflected therefrom. The present invention comprises a combined distance- and orientation-determining device in which directive and orientable radiant energy means are adapted to be directed toward the target along two independent coordinates by suitable manual controls, the operators thereof being guided by indications of the relative displacement between the target orientation and the orientation of the directive radio system.

The distance to the distant object is determined by radiating a recurring sequence of pulses of high frequency radiant energy toward the target, receiving the pulses reflected therefrom, and positioning a member in accordance with the time-phase position of the received pulses relative to the transmitted pulses. Improved apparatus is provided for indicating correspondence between the positioning of this range-indicating or range-tracking member with the time-phase just referred to.

The improved range indication which indicates this correspondence is obtained by producing a wave shape on the screen of the cathode ray tube corresponding to the envelope of the entire received wave, and by magnifying the time scale of that portion of the indication corresponding to the time-phase position of the range indicating member.

The effect of atmospheric and tube noise upon the orientation indications is minimized by "gating" the corresponding indicators, that is, by preventing their actuation except for short intervals corresponding to the position of the range-indicating member, whereby also the range-tracking operator may select the object to be tracked with in orientation by the orientation tracking operators.

An automatic volume control system is provided for maintaining the input to these indicators at the proper level, which is rendered substantially independent of extraneous pulses or radiations by being actuated from the output of this blocking or gating apparatus. In this manner the orientation indications are effective to indicate only with respect to the target.

Further improved circuit means are provided for intensifying the indication of this magnified portion relative to the remainder of the trace, to provide a clearer and more useful type of indication.

Accordingly, it is an object of the present invention to provide improved radio-operated distance- and orientation-determining systems.

It is a further object of the present invention to provide improved radio-operated distance- and orientation-determining systems wherein a distant object may be tracked with in orientation and range by means of improved orientation and range-tracking indicators.

It is another object of the present invention to provide improved distance- and orientation-determining systems in which the distance to the distant object is determined by adjustment of a range-indicating member, which also controls the orientation tracking indicators, whereby only objects having a distance corresponding to the setting of the range-indicating member may be indicated upon the orientation tracking indicators.

It is still another object of the present invention to provide improved pulse-receiving systems in which received pulses are gated to eliminate the effect of atmospheric and tube noise and of extraneous pulses, and wherein automatic volume control derived solely from the gated pulses is utilized so that the amplitude of the gated pulses is rendered substantially independent of such extraneous effects.

It is yet another object of the present invention to provide an improved electronic indicator for indicating the time-phase position of a control member relative to a periodic wave in such manner as to render the indication extremely clear and to attract attention thereto and focus interest thereon.

It is still another object of the present invention to provide improved circuit means for controlling the intensity of the trace of a cathode ray tube having a non-linear sweep voltage producing a non-linear sweeping of the cathode ray beam, whereby the effect of varying velocity of the electron beam upon the trace is substantially eliminated by the control of the intensity of the beam in accordance with this velocity.

Further objects and advantages will become apparent from the following specification and drawings, wherein Fig. 1 shows a schematic block diagram of the entire system of the invention.

Fig. 2 shows a longitudinal cross-section of the radiation and receptivity patterns involved.

Fig. 3 shows a series of voltage versus time curves useful in explaining the operation of the system.

Fig. 4 shows circuit diagrams of the range sweep circuit, the range pulse generator, the pulse gate, the intensifier, and the AVC circuit of the complete system shown in Fig. 1.

Fig. 5 shows a respresentation of the range indicator screen during normal operations.

In each of the figures, the arrows indicate the direction of flow of the control influences.

Referring now to Fig. 1, which shows the complete system of the invention, there is provided a control oscillator 1 of any conventional type adapted to produce an alternating control voltage of suitable frequency, preferably in the audio frequency range. Suitable values of this control frequency have been found to lie between 400 and 2,000 cycles per second. The output of control oscillator 1 is fed to a square wave generator 2 of any conventional type adapted to produce in its output a substantially square wave having a frequency corresponding to that of the control oscillator 1. The output of square wave generator 2 is led, as by a conductor 3, to a pulse generator 4 of any conventional type adapted to produce a periodic pulse wave from the square wave output of generator 2, having a repetition rate corresponding to the output frequency of square wave generator 2 and hence of control oscillator 1, and having a pulse duration which may be of any suitable value, but is preferably of a very short duration, such as of the order of one micro-second. The pulses derived in pulse generator 4 serve to control a suitable conventional high frequency transmitter 6 so as to produce, in the output thereof, periodic pulses of high frequency energy of suitable amplitude, having a repetition rate and a duration substantially the same as that of the pulse wave output of pulse generator 4. The output of transmitter 6 is fed to a suitable transmitting array, indicated in this instance as a directional wave guide transmitting array 7, adapted to produce a fairly broad beam of radiant energy, indicated schematically by the radiation pattern 8 of Fig. 2.

Also provided is a high frequency receiving arrangement 9, which may be of the type described and claimed in copending application Serial No. 429,494, filed February 4, 1942, in the names of Marshall, Barrow and Mieher, now Patent No. 2,531,454, issued November 28, 1950 to Robert J. Marshall, assigned to the same assignee as the present application. As described in that patent the receiving arrangement may comprise a fixed reflector 11 preferably formed of a paraboloid of revolution at whose center is placed a suitable wave guide or other high frequency conductor 12, which is provided with a suitable terminating arrangement 13 described therein and adapted to produce a highly directional receptivity pattern, such as shown at 14 in Fig. 2, having a directivity axis 20 offset from the axis of symmetry 16 of reflector 11 by a predetermined small angle, such as of the order of 2 to 4 degrees, which is highly exaggerated in the drawing. This receptivity pattern 14 is caused to rotate about axis 16 by means of a suitable motor 17 which rotates the terminating arrangement 13 of wave guide 12 as described in the above mentioned prior application.

It is to be understood that the axis of transmitting array 7 and the axis of rotation of receiving array 9 are made substantially parallel, and are suitably orientable along two independent coordinates, such as in elevation and azimuth, under the control of the orientation tracking operators, who orient the device toward the distant object or target in accordance with the orientation tracking indicators to be described below.

If any object is located within the conical receptivity pattern formed by the rotation of pattern 14 about axis 16, the pulses of high frequency energy transmitted from transmitting arrangement 7 will be reflected therefrom and received in the receiving arrangement 9. These pulses of high frequency energy are then led by wave guide 12 to a conventional high frequency heterodyning mixer 18, to which is also fed a suitable high frequency local oscillation wave derived from a conventional local oscillator 19, to produce the usual intermediate frequency wave, which is thereupon amplified in a conventional intermediate frequency amplifier 21. An automatic volume control voltage for intermediate frequency amplifier 21 is derived from the AVC circuit 22 to be later described.

The output of amplifier 21 is led to a conventional second detector 23, and is detected therein to obtain the modulation envelope of the received wave, which is fed to a wide-band amplifier 24. Local oscillator 19, mixer 18, intermediate frequency amplifier 21, detector 23, and wide-band amplifier 24 may be of any type known in the art adapted to produce the functions described.

The envelope of the wave radiated by transmitter 7 may have the wave form illustrated at 29 in Fig. 3A. Since these pulses 29 will take a finite time to travel to the reflecting object and back to receiver 9, the received wave illustrated at 31 in Fig. 3B will contain corresponding pulses 31 but delayed in time phase with respect to pulses 29 by an interval $t$ proportional to the distance to the distant object. These received pulses 31 are also accompanied by stray noise waves and other undesired pulses such as 32, due to multiple reflections or further reflecting objects, which might impair the desired indications. In order to eliminate the effect of such noise and stray pulses the received wave of Fig. 3B derived from amplifier 24 is transmitted through a pulse gate 33 which is adapted, as will be described, to permit only the passage of the desired received pulses 31 while effectively blocking or wiping out all extraneous noise and stray pulses. Pulse gate 33 is placed under the control of range pulse generator 34 which is adapted to produce a sequence of pulses having the same frequency or repetition rate and a duration substantially the same as or slightly longer than the transmitted pulses 29 or received pulses 31. The time phase of these range pulses, illustrated as pulses 36 of Fig. 3C, is made adjustable with respect to the phase of the transmitted pulses 29 and received pulses 31, under the control of a suitable manual control 37 adapted to be actuated by the operator. Pulse gate 33, as will be described, comprises a normally blocked circuit which becomes unblocked only under the influence of pulses 36. By suitably adjusting the phase of the pulses 36 to coincide with that of reflected pulses 31, the desired received pulses corresponding to a particular desired object or target may be transmitted to the further indicating and control circuits to be described, while eliminating all undesired pulses and noise waves.

In order to suitably indicate the phase relation between the range pulses and the received pulses, whereby the operator may tell which received pulses the pulse gate is passing, the entire received wave, before passing through pulse gate 33 (that is, the output of amplifier 24) is impressed upon the vertical deflecting plates 26 of a cathode ray type of range indicator 27. The horizontal deflecting plates of indicator 27 are supplied with a sweep voltage derived from the range sweep circuit 29 which is actuated by the range pulses from generator 34 and the square wave from generator 2, in the manner to be described. The intensity of the range indication thereby produced is controlled by an intensifier circuit 30 actuated by the range sweep circuit 29 and by a pulse derived from the range pulses 36 of Fig. 3C derived from range pulse generator 34. This indication, shown in Fig. 5, is adapted to indicate the phase relation between the range pulses and received pulses in the manner to be described.

Assuming that the range pulse control 37 is actuated so that pulse gate 33 passes only the desired reflected pulses, from which all noise and other pulses have been eliminated, this pulse gate output serves to actuate an automatic volume control circuit 22 in a manner to be described below, which thereupon controls the amplification of some of the stages of I. F. amplifier 21 to maintain the desired received pulses 31 at a substantially constant and useful amplitude. It is noted that in this way only the desired reflected pulses have any effect on the AVC circuit so that their intensity is maintained substantially constant without interference from noise or other pulses.

Referring now to Fig. 4, there is shown in more detail that portion of the circuit of the system of Fig. 1 comprising the range sweep circuit 29, the range pulse generator 34, the pulse gate 33, the automatic volume control circuit 22 and intensifier 30. Thus, considering first the range pulse generator 34, the control voltage derived from control oscillator 1 by way of lead 38 is conducted to an adjustable phase shifter 39 of any conventional type, whose phase shift is adapted to be controlled by manual control knob 37. The output of phase shifter 39 is led to a suitable square wave generator 41 and thence to a pulse generator 42 to produce the pulses 36 corresponding to the wave shown in Fig. 3C. It will be clear that, by suitable adjustment of phase shifter 39, the phase of the square wave output of generator 41 and of the pulses of generator 42 may be suitably adjusted with respect to that of control oscillator 1 as desired. The duration of these range pulses 36 is preferably substantially equal to that of transmitted pulses 29 or slightly longer. These range pulses 36 are fed by way of a suitable coupling condenser 43 and coupling resistor 44 to the control grid of blocking amplifier tube 46 whose cathode is connected to a source of fairly high negative voltage indicated schematically as 47, and whose anode is connected to ground through output resistor 48. The screen grid 45 of tube 46 is connected to the ground as shown at 49. In this manner tube 46 is rendered normally conductive, and the output pulses from pulse generator 42 are adjusted to be of such magnitude and polarity as to interrupt the conduction of tube 46 for the duration of these pulses.

Output resistor 48 is also connected directly in the output circuit of a further blocking amplifier tube 51 of pulse gate 33, whose control grid is energized by the receiver output wave derived from wide-band amplifier 24 and connected to the control grid by way of lead 52 through a coupling condenser 53 and grid resistor 54. The cathode of tube 51 is connected to a source of fairly high negative voltage, which may be the same as source 47, and its anode is connected directly to resistor 48. Tube 51 is also rendered normally conductive, its conductivity being decreased in response to the pulses existing in the received wave input thereto.

Resistor 48 is included in the input circuit of an amplifier tube 56 whose anode is connected directly to a source of high positive potential 57 and whose cathode is connected to a source of low negative biasing potential 58 through an output resistor 59 shunted by a condenser 61. Bias source 58 may also be by-passed for alternating current by means of a by-pass condenser 62.

In operation, in the absence of pulses applied to tube 46 and tube 51, the normal quiescent current through resistor 48 from tubes 46 and 51 will produce a negative voltage thereacross sufficient to overcome the bias of source 58 and to completely cut-off tube 56. Accordingly, zero output voltage will appear at the output 63 of tube 56.

When a pulse from pulse generator 42 is impressed on blocking tube 46 it momentarily decreases the anode current of tube 46 and accordingly decreases the voltage drop across resistor 48. However, the circuit values are so selected that tube 56 is nevertheless still blocked in the absence of a corresponding simultaneous pulse from the received wave impressed on blocking tube 51. When a pulse from pulse generator 42 is impressed on tube 46 simultaneously with a received pulse impressed on tube 51, the resultant decrease in current through resistor 48 is then sufficient to reduce the bias on tube 56 to a point where cathode current can flow.

Accordingly, under these conditions a corresponding pulse will appear on output lead 63. It will be seen that by adjusting the phase of the pulse output from range pulse generator 42, by means of manual adjustment 37, to be in phase coincidence with a desired reflected pulse 31 corresponding to a particular reflecting object or target, an output wave will be derived at lead 63 corresponding to this reflected pulse, but this output will remain entirely unaffected by any other pulses or any accompanying noise waves. Device 33, therefore, acts as a pulse gate to permit passage of a selected pulse determined by the setting of adjustment 37 of the range pulse generator 34. Since these output pulses are of very short duration, as described above, condenser 61 is provided across output resistor 59 of tube 56, of a capacitance adapted to substantially lengthen the pulses impressed on resistor 59. These lengthened pulses may be as shown at 74 in Fig. 3D.

The lengthened output 74 of pulse gate 33 is fed by a lead 64 to the automatic volume control circuit 22. These output pulses 74 are then passed through a rectifier and filter 66 to derive a voltage corresponding to the average intensity of the pulses transmitted by pulse gate 33. This voltage is then applied to the control grid of a control tube 67 whose cathode is connected to a source of low positive voltage 68' providing a grid bias for the control grid of tube 67. The anode-cathode path of tube 67 is connected in series with a resistor 68 and the anode-cathode circuit of a power tube 69, the anode of tube 69 being then connected to a source of high positive voltage 71. The voltage drop across resistor 68 is then suplied to the control grid of tube 69 by means of lead 72.

In effect, the output of rectifier 66 controls the conductivity and hence the internal resistance of tube 67. In this manner, the amount of current drawn from source 71 through tube 69 and resistor 68 is controlled by the intensity of the gated pulses 74. Should this intensity vary so as to decrease the internal resistance of tube 67, it will be clear that more current will flow through resistor 68 producing a larger bias on the control grid of tube 69 tending to oppose this changing of current. Accordingly, the internal resistance of tube 69 will also change but in an opposite sense and an equilibrium condition will be reached once more. However, the potential of the cathode of tube 69 will no longer be the same as before the change in intensity of the gated pulse. As was seen, the effective resistance of tube 67 was decreased in the illustration used and the effective resistance of tube 69 was increased. Accordingly, the potential of the cathode of tube 69 will be lowered. It will be clear that a reverse change will follow an opposite change in pulse intensity. In this way, the potential of the cathode of tube 69 will correspond to the intensity of the gated pulses.

This potential is of a fairly high positive value and, accordingly, may be used directly to energize the screen grids of the intermediate frequency amplifier tubes of amplifier 21, and thereby serves to maintain the intensity or amplitude of the gated pulses at a substantially constant value. This is done by way of lead 73 connecting the AVC voltage to I.F. amplifier 21.

Certain features of the AVC system briefly described above, are disclosed and claimed in copending application Serial No. 509,225 of Horace Myrl Stearns, now Patent No. 2,408,821 issued October 8, 1946.

As has just been seen, the desired reflected pulse will be transmited by pulse gate 33 only if the phase of the range pulses generated by generator 34 is adjusted by means of manual control 37 to the proper phase position with respect to the received reflected pulses. In order to indicate when this proper phase relation is obtained, it is therefore necessary to indicate phase coincidence between the desired reflected pulses and the range pulses. For this purpose, the entire received wave derived from amplifier 24 is impressed on the vertical deflecting plates 26 of range indicator 27. Horizontal deflecting plates 28 of indicator 27 are supplied from the range sweep circuit 29. The output voltage of the range sweep circuit 29 is made to be of such a character as to indicate phase coincidence between the range pulses and the desired received pulses. This is done by providing a generally linear time sweep on the horizontal deflecting plates 28, and by instantaneously expanding the time scale of the sweep voltage at the phase position relative to the radiated pulses corresponding to the phase of the range pulses to thereby indicate this phase relation. The magnification of the sweep voltage time scale is produced by sharply increasing the rate of change of the sweep voltage for a short period of the order of magnitude of the range pulse and in phase synchronism with the range pulse.

For this purpose, the output of range pulse generator 34, is fed to the input circuit of the sweep control tube 76 by means of a lead 75.

A sweep square wave 86 (Fig. 3E) obtained from square wave generator 2 by means of lead 77 is impressed by way of a suitable coupling condenser 78 and grid resistor 79 upon the control grid 81 of a sweep control tube 82, whose anode is connected directly to a source of positive potential such as 83, and whose cathode is connected to the anode 80 of sweep control tube 76, whose cathode is connected to ground through a suitable biasing resistor 85. This sweep square wave 86 has a predetermined fixed phase relation with respect to the radiated pulses 29, which are derived therefrom by means of pulse generator 4. Preferably, although not necessarily, the radiated pulses 29 are initiated at the same instant as the square wave pulses 86 terminate, as shown in Fig. 3.

Selectively connected between anode 80 of tube 76 and ground, as by means of a switch 89, are condensers 87, 88 having differing capacitances, providing, as will be seen, different rates of sweep. Assuming for the moment that condenser 87 is thus connected in the circuit by means of switch 89, it will be clear that during the positive half cycles of the sweep square wave, 86, when tube 82 is conductive, condenser 87 will be charged to a voltage corresponding to the amplitude of the sweep square wave 86. The amplitude of the sweep square wave and the value of resistor 79 are so chosen that during the negative half cycles of the sweep square wave 86, control tube 82 is completely blocked.

Accordingly, condenser 87 will then discharge through tube 76, providing a voltage across terminals 91 of the type shown at 92 in Fig. 3F. The discharging voltage of condenser 87, corresponding to the portions 93 of wave 92, will vary substantially linearly with time, since pentode tube 76 is essentially a constant current device, as is well known. Hence this voltage may be used as a time sweep voltage for range indicator 27. However, this provides no indication of the relative phase position of the range pulses, as is desired.

In order to provide such an indication, the rate of change of this sweep voltage 93 is momentarily greatly increased at the time phase position corresponding to the range pulses 36. This is done by the action of expander control tube 76, whose anode-cathode circuit is connected in shunt with condenser 87.

The control grid 84 of tube 76 is energized by the range pulses 36 (Fig. 3C) derived from range pulse generator 42 by lead 75. During the interval between the range pulses 36, tube 76 exhibits a high resistance, which, determines the discharge rate of condenser 87. The graph of this discharging voltage may be as at 96 in Fig. 3G.

The expander pulse 36 serves to greatly increase the discharge rate of condenser 87 during the short duration of the expander pulses, as shown at 97 in Fig. 3G. After the cessation of expander pulse 36, expander control tube 76 resumes its normal high resistance, and the discharge of condenser 87 then becomes as shown at 98, being substantially at the same rate as that during interval 96.

Accordingly, for the interval 96 the cathode ray beam of indicator 27 will be swept relatively slowly across the screen. During interval 97, the velocity of the sweep is greatly increased, thereby effectively magnifying the time scale for this portion of the sweep. For the remaining portion 98 of the sweep the slow rate is resumed.

Hence, as shown in Fig. 5, during the intervals 96 and 98, the image of the received wave will be of normal size. During interval 97, however, this image will be greatly widened. By making this widening effect of a marked character, a distinct indication is produced of the time phase position of the range pulse 36 relative to the received wave.

Accordingly, the operator, to maintain the pulse gate properly positioned with respect to the desired received pulse, need merely operate manual control 37 to maintain the image 31' (Fig. 5) of such desired received pulse in a magnified condition on the screen of indicator 27, while any other pulses 32', or noise waves will only have unexpanded appearance. In effect, by proper choice of the rate of change of the sweep voltage during intervals 96 and 98, relative to that during interval 97, pulses 32' of Fig. 5 may be made to have the character merely of short vertical line segments, whereas the actual wave shape of the desired received pulse 31 may be made much clearer by its magnification during interval 97.

The speeding up of the sweep of the electron beam in range indicator 27 causes a definite decrease in brightness of the trace produced thereby during this expanded portion. In order to avoid this effect and also to make the brightness of the expanded portion of the trace greater than that of the remaining portion of the indication, the intensifier circuit 30 is used to control the brightness of the trace.

Thus, the sweep voltage appearing on lead 91 is differentiated by the differentiating circuit comprising condenser 121 and resistor 122. As is well known, the voltage across resistor 122, if its resistance is of a low value compared to the reactance of condenser 121 at the frequency components of the input wave, will be substantially a pure time derivative of the voltage on lead 91. This voltage across resistor 122 is shown in Fig. 3H, having a constant low magnitude during intervals 96' and 98' corresponding to the low rates of change during the portions 96 and 98 of the sweep voltage, and having a high value 97' during the high rate of change portion 97 of the sweep voltage.

Since the brightness of the trace is substantially inversely proportional to the velocity of the trace and substantially directly proportional to the voltage applied to the intensity control grid 25 of indicator 27, it will be seen that by impressing the voltage wave of Fig. 3H upon intensity control grid 25 the resulting trace will have substantially constant brightness during the entire sweep. Also, the electron beam will be effectively cut off during the periods in which the sweep voltage does not occur, as is very desirable in order to prevent stray indications which might confuse the operator.

However, it is preferable that the brightness of the expanded portion of the trace be further increased in order to provide more easily visible indication of the desired tracking condition. For this purpose it is necessary to increase the magnitude of the high amplitude portion 97' of the intensifier voltage of Fig. 3H.

Thus, as shown in Fig. 4, the voltage across resistor 122 is applied to the input circuit of an amplifier tube 123, whose anode is connected to a source of high positive potential 124 and whose cathode is connected to ground through a resistor 126.

A further tube 127 is provided in parallel with tube 123 and having its control grid energized from the pulse generator 42 by way of lead 128, coupling condenser 129, and grid input resistor 131.

As has been described above, and as is shown in Fig. 3, the time phase position of the high amplitude portion 97' of the intensifier voltage is the same as the time phase position of the range pulse 36. Tubes 123 and 127 respectively are fed by the waves of Fig. 3H and Fig. 3C, and accordingly produce output currents corresponding to these waves. These currents are added in the common cathode resistor 126 and, accordingly, the voltage appearing across resistor 126 will have the wave form corresponding to the sum of the wave forms of Figs. 3H and 3C. In other words, it will have the wave form shown at 132 in Fig. 3K, in which the large amplitude portion 133 now has a magnitude which is increased relative to the magnitude of the low intensity portion 134.

This wave of Fig. 3K is then applied to the intensity control grid 25 of indicator 27 by way of lead 136 to produce the desired increased brightness of the expanded indication 31' shown in Fig. 5.

Certain features of the above expanded trace control system are disclosed and claimed in copending application Serial No. 504,872 in the names of Eric J. Isbister and Walter N. Dean which issued November 16, 1948 as Patent No. 2,453,711.

Since, as described above, the time phase of the reflected pulse relative to the radiated pulse is a measure of the distance or range of the reflecting object, it will be seen that the phase shift required to synchronize the range pulses and the pulse gate with the reflected pulses corresponds to the range of the object. Accordingly, the setting of manual control 37 or the indication of Fig. 5 may be used to indicate this range directly, by the use of suitable scales associated with control 37 or the screen of indicator 27. Hence, in effect, the operator tracks with the reflecting object, in range, by maintaining the reflected pulse centered within the pulse gate.

Thus far the present system has been concerned merely with tracking in range with the reflected pulse corresponding to a desired object to be detected. It is also desirable to track with the orientation of the distant reflecting object. This may be done by moving the axis 16 of Fig. 2 of the receiving apparatus so as to maintain this axis oriented toward the target along two independent coordinates such as, for example, azimuth and elevation. For this purpose it is desirable to indicate relative displacement between axis 16 and the object orientation, so that the operator may correct such displacement to maintain the desired tracking condition.

Considering for the moment an object which may have an orientation 15 (Fig. 2) with respect to axis 16 of the receiving mechanism, it will be seen that as the receptivity pattern 14 rotates about its axis 16, the intensity of the pulses reflected from the object located along line 15 will vary periodically at the frequency of rotation. Thus, as the pattern 14 sweeps across this object, maximum intensity will be received, while 180° of rotation later, minimum reception will be obtained. In this manner, a modulation of rotational frequency is impressed upon the reflected pulse intensity. It will be clear that the time phase of this modulation relative to the pattern rotation represents the relative displacement between the orientation of axis 16 and the object orientation.

To indicate this displacement, a two-phase generator 101 (Fig. 1) is rotated simultaneously with pattern 14 by direct coupling to motor 17 serving to rotate wave guide termination 13. In this way two voltages are produced displaced 90 electrical degrees in phase and of the same frequency as the pulse modulation. By adjusting the phases of these voltages so that, for example, the maximum value of one occurs at the maximum elevation of the pattern 14 and the maximum value of the other occurs at the maximum azimuth, the azimuth and elevation components of the relative displacement between rotation axis orientation and object orientation may be obtained by comparing these voltages with the pulse rotation modulation envelope produced by the pattern. Such comparisons are made in azimuth and elevation phase detectors 106 and 107 whose outputs thereupon actuate corresponding azimuth and elevation error indicators 108 and 109.

Phase detectors 106, 107 each include means for deriving the modulation envelope wave from the modulated pulse wave, and means for comparing the phase of this envelope with the reference voltages supplied from generator 101. In this way unidirectional voltages corresponding to the relative azimuth and elevation components of displacement between the object orientation and the rotation axis are produced, which may be used to deflect a cathode ray trace on indicators 108, 109 to indicate this displacement.

It is to be understood that suitable amplifiers may be inserted in the circuit wherever needed to perform the functions described.

The rotational axis 16 is preferably made adjustable in azimuth and elevation, under the control of suitable manually operated controls. In operation, the range operator will select one distant object to be tracked, by adjustment of control 37. In this manner, the pulse gate 33 is simultaneously adjusted, so that the indications produced on indicators 108, 109 refer solely to this selected object. The azimuth and elevation operators then adjust the orientation of the rotation axis to maintain their respective indicators at zero. In his manner, the distant object may be tracked with both in range and orientation.

The tracking system just described may be used to orient any directable device which it is desired to track with a distant target, by simultaneous actuation with axis 16. Such devices may include searchlights, sound locators, guns, gun directors, etc.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio range-determining system comprising means for transmitting a recurring sequence of pulses of radiant energy having predetermined periodicity, means for receiving the portion of said energy reflected from a distant object, said received pulses being thereby delayed in time-phase with respect to said transmitted pulses by an amount corresponding to the range of said object, a cathode ray tube, means for periodically sweeping the electron beam thereof across the screen thereof at a constant velocity and in a predetermined direction in synchronism with said pulse periodicity, means for deflecting said beam in a second direction in correspondence with the envelope of said received energy, a range-indicating member, means for generating local, short-duration pulses synchronized with and of length substantially equal to the length of said transmitted pulses, means under the control of said member for shifting the phase of said generated pulses with respect to said transmitted pulses, and means under the control of said phase-shifted pulses for momentarily increasing the sweep velocity of said beam for the duration of said phase-shifted pulses at the beam position corresponding to the time-phase of said phase-shifted pulses relative to said transmitted pulses, whereby the beam trace at said position is momentarily magnified so that, when said magnified position coincides with the portion of said envelope corresponding to said reflected pulses, said member is thereby positioned in accordance with the range of said object.

2. A radio range-determining system comprising means for transmitting a recurring sequence of pulses of radiant energy having predetermined periodicity, means for receiving the portion of said energy reflected from a distant object, said received pulses being thereby delayed in time-phase with respect to said transmitted pulses by an amount corresponding to the range of said object, a cathode ray tube, means for deflecting the electron beam thereof to produce a trace corresponding to the periodically-recurring envelope of said received energy, a range-indicating member, means for generating local pulses synchronized with said transmitted pulses and of duration substantially equal to the duration of said transmitted pulses, means under the control of said range-indicating member for shifting the phase of said generated pulses with respect to said transmitted pulses, and means under the control of said phase-shifted pulses for momentarily magnifying said trace for the duration of said phase-shifted pulses at the beam position corresponding to the time-phase of said phase-shifted pulses relative to said transmitted pulses, whereby when said magnified position coincides with the portion of said envelope corresponding to said reflected pulses, said member is positioned in accordance with the range of said object.

3. A radio indicating system comprising means for transmitting a recurring sequence of pulses of radiant energy having predetermined periodicity, means for receiving the portion of said energy reflected from a distant object, said received pulses being thereby delayed in time-phase with respect to said transmitted pulses by an amount corresponding to the range of said object, a cathode ray tube, means for deflecting the electron beam thereof to produce a trace corresponding to the periodically-recurring envelope of said received energy, a control member, means for generating local pulses synchronized with said transmitted pulses, means under the control of said member for shifting the phase of said local pulses with respect to said transmitted pulses, means under the control of said local pulse generating means for passing the portion of said envelope having time-phase corresponding to the time-phase of said phase-shifted pulses and for rejecting portions of said envelope of non-concurrent time-phase with respect thereto, and means under the control of said phase-shifted pulses for momentarily magnifying said trace at the position corresponding to the time-phase of said phase-shifted pulses relative to said transmitted pulses, whereby, when said magnified position coincides with the portion of said envelope corresponding to said reflected pulses, said reflected pulses are passed by said passing means.

4. A radio range and orientation determining system comprising means for transmitting a recurring sequence of pulses of radiant energy having predetermined periodicity, means for receiving the portion of said energy reflected from a distant object, said received pulses being thereby delayed in time-phase with respect to said transmitted pulses by an amount corresponding to the range of said object, a cathode ray tube, means for deflecting the electron beam thereof to produce a trace corresponding to the periodically-recurring envelope of said received energy, a control member, means for passing only that portion of the envelope of said received wave having a time-phase with respect to said transmitted pulses corresponding to the position of said control member, and means for magnifying the portion of said trace at the position corresponding to said last time-phase, whereby, when said magnified position coincides with the portion of said envelope corresponding to said reflected pulses, said member is thereby positioned in accordance with the range of said object and said reflected pulses are passed by said passing means.

5. A radio range- and orientation-determining system as in claim 4, further comprising means responsive to said passed pulses for indicating relative lack of correspondence between the orientation of said object and the orientation of said system.

6. A pulse receiving system comprising means for receiving periodic pulses of radiant energy; means including a screen grid amplifier for deriving therefrom the wave envelope of said energy; gating means for passing only pulses of a predetermined time-phase within each of said periods, said gating means comprising a manually controlled member, means for producing local pulses of the same periodicity as said received pulses, means for adjusting the phase of said local pulses under the control of said member, and means for passing only that portion of said envelope existing simultaneously with said local pulses; means for producing a voltage corresponding to the average amplitude of said passed pulses; a voltage divider comprising the anode-cathode circuits of a pair of electron discharge tubes and a resistor connected therebetween; means for controlling the resistance of one of said anode-cathode circuits in accordance with said average voltage; means for controlling the resistance of the other of said anode-cathode circuits in accordance with the voltage drop across said resistor; and means for applying the voltage drop across said resistor and said first anode-cathode circuit in series to the screen grid of said amplifier to control the amplification thereof, whereby said passed pulses are maintained substantially at constant amplitude without being affected by extraneous pulses or other waves.

7. A pulse receiving system comprising means for receiving periodic pulses of radiant energy, means including a screen grid amplifier for deriving therefrom the wave envelope of said energy, gating means for passing only pulses of a predetermined time-phase within each of said periods, said gating means comprising a manually controlled member, means for producing local pulses of the said periodicity of said received pulses and of the same order of duration as said received pulses, means for adjusting the phase of said local pulses under the control of said member and means for passing only that portion of said envelope existing simultaneously with said pulses and blocking the preceding received pulses and the succeeding received pulses, means for producing a voltage corresponding to the average amplitude of said passed pulses, and means for controlling the amplification of said amplifier to maintain said passed pulses at substantially constant amplitude without being affected by extraneous pulses or other waves.

8. A pulse receiving system comprising means for receiving periodic pulses of radiant energy, means including a screen grid amplifier for deriving therefrom the wave envelope of said energy, gating means for passing only pulses of a predetermined adjustable time-phase within each of said periods, said last named means comprising means for passing pulses during a gate of duration of the same order of magnitude as the duration of the pulses and for blocking pulses preceding said gate and also blocking pulses succeeding said gate, means for producing a voltage corresponding to the average amplitude of said passed pulses, and means for controlling the amplification of said amplifier by said average voltage whereby said passed pulses are maintained substantially at constant amplitude without being affected by extraneous pulses or other waves.

9. A pulse receiver comprising means for receiving pulses of radiant energy, a cathode ray tube, means for periodically sweeping the electron beam thereof across the screen thereof at a constant velocity and in a predetermined direction, means for deflecting the beam of said cathode ray tube to produce a trace corresponding to the envelope of said received pulses, an adjustable pulse generator providing local pulses shiftable in time-phase relative to said received pulses, a selected pulse output circuit, a pulse gate actuated by said local pulses for passing to said output circuit only that portion of received energy corresponding in time-phase to the local pulses, and means actuated by said local pulses for accelerating the sweep of the beam of said cathode ray tube to magnify said trace at the position corresponding to the time-phase of said local pulses, whereby the portion of the received energy passed by said pulse gate is represented by a magnified trace on said cathode ray tube.

10. A pulse receiver comprising means for receiving radiant energy, a cathode ray tube, means for deflecting the beam of said cathode ray tube to produce a trace corresponding to the envelope of received energy, a control member, gating means controlled by said control member for passing only that portion of received energy having a time-phase corresponding to the position of said control member, and means responsive to said control member for magnifying the portion of said trace having a time-phase corresponding to the position of said control member, whereby the magnified portion of said trace indicates the portion of the received energy passed through said gating means.

11. A pulse receiving system comprising means for receiving periodic pulses of radiant energy, a manually controlled member, means for producing local pulses of the same periodicity as said received pulses and of the same order of duration as said received pulses, means controlled by said member for adjusting the phase of said local pulses to correspond to the position of said member, gating means actuated by said local pulses for passing received pulses existing simultaneously with said local pulses and blocking received pulses preceding said local pulses and received pulses succeeding said local pulses, means for producing a voltage corresponding to the average amplitude of said passed pulses, and means for controlling the amplification of said receiving means to maintain said passed pulses at substantially constant amplitude without being affected by extraneous pulses or other waves.

12. A pulse receiving system comprising means for receiving pulses of radiant energy, a manually adjustable control member, gating means controlled by said member for passing only pulses having a time-phase corresponding to the position of said member, means for indicating the time-phase of said passed pulses relative to all received pulses, and means for controlling the amplification of said receiving means according to the average amplitude of said passed pulses whereby said passed pulses are maintained substantially at constant amplitude without being affected by extraneous pulses or other waves.

13. In a receiving system adapted simultaneously to select a desired one of a plurality of pulse signals and to provide a distinctive indication of the selected signal, the combination of a cathode-ray tube, means for deflecting the beam of said cathode-ray tube to produce a trace corresponding to said plurality of signals, a control member, gating means controlled by said control member for passing a selected one of said pulse signals dependent upon the setting of said control member, and means responsive to said control member for magnifying the portion of said trace corresponding to said selected pulse signal.

ERIC J. ISBISTER.
HORACE MYRL STEARNS.
WALTER N. DEAN.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,055,883 | Terry | Sept. 29, 1936 |
| 2,078,644 | Swedlund | Apr. 27, 1937 |
| 2,208,110 | Andreatta | July 16, 1940 |
| 2,219,188 | Kuehni | Oct. 22, 1940 |
| 2,224,134 | Blumlein | Dec. 10, 1940 |
| 2,227,598 | Lyman et al. | Jan. 7, 1941 |
| 2,300,189 | Wolff | Oct. 27, 1942 |
| 2,313,967 | Read | Mar. 16, 1943 |
| 2,361,437 | Trevor | Oct. 31, 1944 |
| 2,368,448 | Cook | Jan. 30, 1945 |
| 2,409,462 | Zworykin | Oct. 15, 1946 |
| 2,416,088 | Deerhake | Feb. 18, 1947 |
| 2,498,381 | Smith | Feb. 21, 1950 |